United States Patent Office 3,326,976
Patented June 20, 1967

3,326,976
FLUORINATED GEM-DIAMINES AND FLUORINATED GEM-ALKYLDIAMINES AND THE PROCESS FOR THEIR PREPARATION
William J. Middleton, Wilmington, Del., assignor to E. I. du Pont de Nemours and Company, Wilmington, Del., a corporation of Delaware
No Drawing. Filed Dec. 11, 1963, Ser. No. 329,904
13 Claims. (Cl. 260—583)

This application is a continuation-in-part of my coassigned application, Serial No. 134,815, filed August 30, 1961, now abandoned.

This invention relates to new fluorinated nitrogen-containing compounds and to their preparation.

The formula, $CF_2(NH_2)_2$, is disclosed in the literature [C.A. 51, 6077C (1957)]. However, α-fluoro primary amines, the class of which the above represented compound is a member, are known to be unstable and lose hydrogen fluoride readily. For example, α-aminoperfluoropropane, prepared by reacting hydrogen fluoride with hexafluoroisopropylideneimine,

is unstable and easily loses hydrogen fluoride. At page 243 of Simons, "Fluorine Chemistry," volume 2, the author states that amines which contain fluorine atoms vicinal to the primary amino group have not been reported but that such compounds would be expected to yield nitriles by loss of hydrogen fluoride according to the equation:

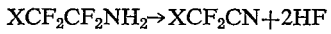

Further, compounds having two amino groups attached to the same carbon atom are known to be unstable (Whitmore, "Organic Chemistry," second edition, page 329). Illustrative is diaminomethane, $CH_2(NH_2)_2$, which has never been reported as existing in the free state. Only its hydrohalide salts, which can be prepared from formamide, are known to be stable. (See Whitmore, cited above, and Ber. 47, 2698).

The present invention represents a great advance in the art by providing compounds which have two amino groups attached to the same carbon atom but nevertheless are found, quite unexpectedly, to be stable, as evidenced by their use as polymer intermediates. This stability is completely unpredictable from the heretofore known properties of such compounds, i.e., gem-diamines. In contrast to the above-discussed α-fluoroamines, the amines of this invention contain no fluorine atoms on the carbon to which the amino groups are attached and therefore do not decompose by loss of hydrogen fluoride.

The compounds of this invention are of the general formula:

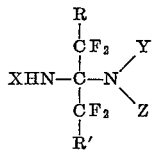

wherein R and R¹, which can be the same or different, are hydrogen, halogen, perhaloalkyl of up to 18 carbons, or ω-hydroperhaloalkyl of up to 18 carbons, the halogens in each instance being of atomic number 9 to 17, i.e. chlorine or fluorine; X is hydrogen, alkyl of up to 18 carbons, cycloalkyl of up to 7 carbons, or aryl of up to 14 carbons; Y taken singly is hydrogen, alkyl of up to 18 carbons, cycloalkyl of up to 7 carbons, aryl of up to 14 carbons, or amino, including mono- and disubstituted alkylamino of up to 18 carbons and monosubstituted arylamino of up to 14 carbons; and Z taken singly is hydrogen, alkyl of up to 18 carbons, or cycloalkyl of up to 7 carbons.

The products of this invention are prepared by the general process which comprises reacting an alkylidenimine of the formula:

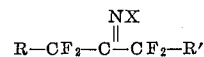

in which X, R and R' have the above indicated meanings, with at least an equivalent molar amount of ammonia, a primary or secondary alkyl amine of up to 18 carbons, a primary arylamine of up to 14 carbons, a primary or secondary cycloalkylamine of up to 7 carbons, hydrazine, a mono- or sym. or unsym. disubstituted hydrazine in which the substituent is of the group consisting of alkyl of up to 18 carbons, aryl of up to 14 carbons, or cycloalkyl of up to 7 carbons. After addition of the ammonia, amine, etc., is completed, the reaction mixture is maintained under reflux for at least 15 minutes. Thereafter, the reaction mixture is removed from the reactor and the desired products are isolated by conventional means, e.g., the solvent is removed by evaporation, and the residue is then distilled to isolate the desired product. Preferably, the ammonia, amine, etc., and imine are present in equimolar amounts.

The reaction can be carried out in the presence or absence of a medium which can be any mutual solvent which is normally liquid and which will not react with the reactants or reaction products. Examples of suitable solvents are chloroform, methylene chloride, dimethyl and diethyl ethers, tetrahydrofuran, cyclohexane, etc. Since the reaction is effected under reflux conditions, the temperature of reaction will depend upon the particular solvent and reactants employed.

The operating pressure is not critical, and therefore, it is most convenient to operate at ambient pressure. Thereafter, the desired products are isolated by conventional means, e.g., by fractional distillation, etc.

The above process is illustrated generically by the equation:

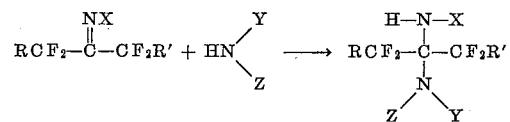

in which R, R', Y, Z, and X have the already indicated meanings.

Alkylideneimines of the general formula:

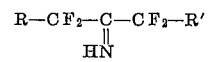

in which the R's have the already indicated meanings are made by reacting a polyhalothioketone, in which each of the carbons adjacent to the thiocarbonyl group contain at least two fluorine atoms, with hydrazoic acid.

Although not essential, in the method which produces the alkylideneimines from the polyhalothioketone and hydrazoic acid, as a safety measure, it is desirable to conduct the reaction in two steps. In the first step the addition of the hydrazoic acid to the polyhalothioketone is carried out at −50° C. to 0° C.; and, after the addition is complete, the mixture is heated to between 20° and 100° C. until reaction is complete, as evidenced by cessation of gas evolution. This makes it possible to keep the reaction under control when using elementary reaction equipment not suitable for rigorous process conditions. Preferably, the acid and thioketone are contacted at a temperature between −20° C. and 0° C., and the reaction mixture is thereafter warmed to a temperature between 40° C. and 60° C.

The pressure at which the reaction is conducted is not critical; and therefore, it is most convenient to operate at ambient pressure.

The hydrazoic acid and polyhalothioketone react in equimolar amounts, and therefore, these reactants are preferably used in a 1:1 molar ratio. However, an excess of either reactant can be employed at the expense of process efficiency.

Although it is not essential, it is preferred that the hydrazoic acid and polyhalothioketone be contacted in a mutually inert organic solvent. Any mutual solvent which is normally liquid and which will not react with the reactants and products is satisfactory. Examples of suitable solvents are chloroform, methylene chloride, dimethyl and diethyl ethers, tetrahydrofuran, cyclohexane, etc. The amount of solvent, if any, is not critical and it can equal or exceed the weight of reactants by many fold.

The polyhalothioketones useful in preparing the imine intermediates employed in the preparation of the compounds of this invention are those which correspond in structure to

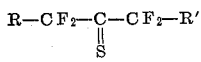

wherein R and R′ have the previously indicated meanings. Examples of such polyhalothioketones are octafluoro-2-butathione

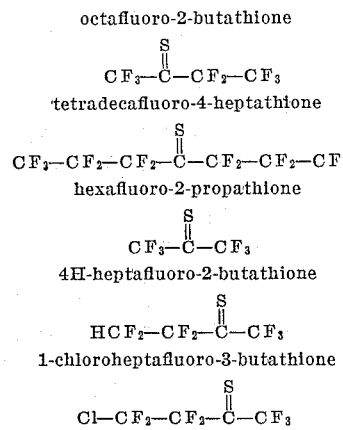

tetradecafluoro-4-heptathione $$CF_3-CF_2-CF_2-\underset{\underset{S}{\|}}{C}-CF_2-CF_2-CF_3,$$

hexafluoro-2-propathione $$CF_3-\underset{\underset{S}{\|}}{C}-CF_3$$

4H-heptafluoro-2-butathione $$HCF_2-CF_2-\underset{\underset{S}{\|}}{C}-CF_3$$

1-chloroheptafluoro-3-butathione $$Cl-CF_2-CF_2-\underset{\underset{S}{\|}}{C}-CF_3$$

and the like.

The above are known compounds, prepared as described in U.S. Patent 2,970,173 by any of the following:

(1) reacting a secondary polyfluoroalkyl iodide of at least three carbons in the alkyl group with a phosphorus polysulfide, e.g., $P_2S_5$ or $P_4S_3$, in the liquid or vapor state at elevated temperatures;

(2) heating a polyfluoroketone with phosphorus pentasulfide for several hours at 200° to 300° C. under autogenous pressure;

(3) reacting a secondary perfluoroalkanethiol with a hydrogen fluoride acceptor, e.g., sodium fluoride;

(4) reacting sulfur with a perfluoroolefin of at least three carbon atoms at 400° to 650° C; or (5) thermal decomposition of selected polyfluorinated dithietanes at 450° to 700° C.

A method for preparing alkylideneimines of the formula

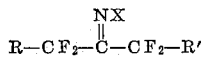

in which the R's are as already defined and X is alkyl or cycloalkyl, comprises a two-step process which is, in part, schematically represented as follows:

(A)

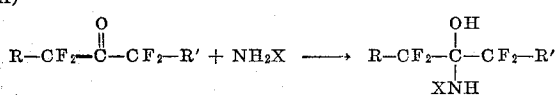

(B)

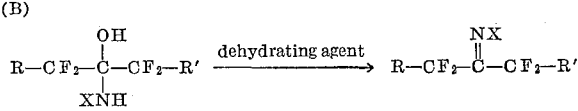

In step A the polyhaloketone is contacted with at least one molar equivalent of ammonia (X=H) or an amine (X=alkyl or cycloalkyl) at a temperature in the range of −50° C. to 10° C. A normally liquid reaction medium is preferably used to assist in the dissipation of the heat of reaction. For optimum control of the reaction, it is preferred that all of the ammonia or amine be added incrementally to a cold (−15° C. or less) solution of the polyhaloketone while the temperature of the reaction mixture is maintained at −15° C. or less. The aminohydroxy polyhaloalkane produced can be isolated, if desired, by known techniques.

In Step B the intermediate from Step A is dehydrated by warming a mixture of the intermediate, a dehydrating agent ($POCl_3$), and an acid acceptor (pyridine) to at least the reflux temperature of the mixture. The intermediate from Step A can be employed in this step either in its pure or crude form, i.e., the dehydrating agent and acid acceptor can be added directly to the product mixture from Step A. The desired imine can be removed from the product mixture either by permitting it to distill off during the dehydration step or subsequently distilling the product mixture. The imine can then be purified by fractional distillation.

A method for preparing N-aryl-alkylideneimines of the formula:

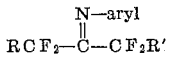

in which R and R′ are as already defined comprises reacting a polyfluoroketone with an aryl isocyanate, in accord with the equation:

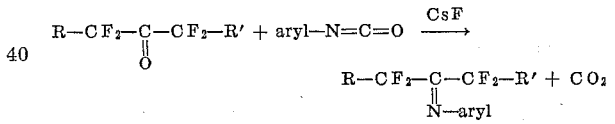

The above synthesis is illustrated by the second part of Example IV.

Examples of amines and hydrazines usefully employable in converting the alkylideneimines to the products of this invention are ammonia, cyclohexylamine, methylcyclohexylamine, ethylamine, butylamine, hexylamine, dodecylamine, octadecylamine, aniline, α-naphthylamine, piperazine, hydrazine, N-methylhydrazine, N-phenylhydrazine, N,N-diphenylhydrazine, N-naphthylhydrazine, N,N-dinaphthylhydrazine, and the like.

It is obvious that the heretofore disclosed alkyl amines, aryl amines, and alkyl, alkylamino, haloalkyl, hydrohaloalkyl, aryl, and arylamino substituents containing seven or fewer carbon atoms are least expensive and most available, and to that extent preferred. But there is to be no question of the operability of, or of the intent to disclose and include within the present invention, any arylamine or aryl or arylamino substituent of up to 14 carbon atoms and any alkyl amine, or alkyl, alkylamino, pherhaloalkyl, or ω-hydroperhaloalkyl group of up to 18 carbon atoms. The widest variation of compounds or groups within this definition does not in any way detract from the fundamental characteristics of either the product or of the process features of the present invention.

The examples which follow are intended to illustrate, but do not limit, this invention.

EXAMPLE I

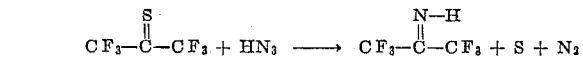

One hundred milliliters of 1N hydrazoic acid in chloroform was cooled to −15° C. and 18.2 g. (0.1 mole) of hexafluorothioacetone was added dropwise. A vigorous evolution of nitrogen occurred. The blue color faded and a yellow precipitate formed. The reaction mixture was then warmed to 50° C. in 5 to 10 minutes and the gases that evolved were condensed in an ice-cooled trap. The condensate was distilled through a spinning band still to give 5 ml. of hexafluoropropylideneimine as a colorless liquid, B.P. 15 to 17° C., contaminated with about 6% of choloroform, as determined by vapor-phase chromatographic analysis. A purer sample of hexafluoroisopropylideneimine was prepared by substituting chlorobenzene and tetrachloroethane, respectively, for the chloroform, but in both cases a lower yield was obtained. The pure imine has a B.P. of 16–16.5° C., M.P. Ca. −47° C., $d^0/4$ ca. 1.51.

Nuclear magnetic resonance, infrared, and mass spectrographic data are consistent with the assignment of the structure

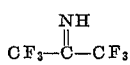

to the product.

*Analysis.*—Calcd. for $C_3HF_6N$: C, 21.83; H, 0.61; F, 69.07; N, 8.46. Found: C, 21.81; H, 0.76; F, 68.81; N, 8.16.

*Hexafluoropropane-2,2-diamine*

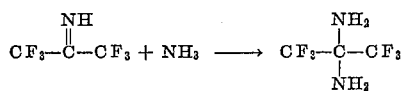

Ammonia, 8.5 g. (0.5 mole), was distilled into a flask cooled in an ice bath and containing 39 g. (0.25 mole) of hexafluoroisopropylideneimine, prepared as described above. After the addition, the mixture was refluxed for five minutes and then distilled. There was obtained 42.5 g. of hexafluoropropane-2,2-diamine as a colorless liquid, B.P. 91–91.5° C., $n_D^{25}$ 1.3229.

*Analysis.*—Calcd. for $C_3H_4F_6N_2$: C, 19.79; H, 2.21; N, 15.39; F, 62.61. Found: C, 20.11; H, 2.28; N, 15.82; F, 62.27.

EXAMPLE II

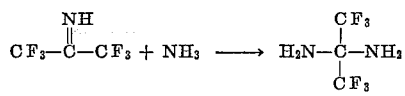

Ammonia, 0.1 ml., was added to a refluxing solution of 5.5 ml. (0.05 mole) of hexaflurorisopropylideneimine, prepared as in Example I, in 15 ml. of dimethyl ether. Since no visible reaction occurred after one hour, an additional 1 ml. of ammonia was added. The mixture then became yellow and a solid formed. The reaction mixture was stirred under reflux for two hours. The solvent was evaporated and the residue was distilled to give 4.48 g. of hexafluoropropane-2,2-diamine as a colorless liquid, B.P. 91° C., M.P. 20.5° C., $n_D^{24.5}$ 1.3329.

*Analysis.*—Calcd. for $C_3H_4F_6N_2$: C, 19.79; H, 2.21; F, 62.61; N, 15.39. Found: C, 20.38; H, 2.31; F, 62.75; N, 15.60. The infrared spectrum indicated the presence of $NH_2$ at $2.92\mu$ and $3.0\mu$. Both the fluorine and hydrogen $n$–$m$–$r$ spectra contained a single unsplit resonance line.

EXAMPLE III

*1,3-dichloro-1,1,3,3-tetrafluoro-2,2-propanediamine*

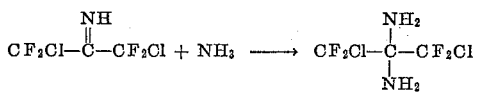

Ammonia, 6.6 ml., at −78° C. (about 0.3 mole) was distilled into a flask containing 39.6 g. (0.2 mole) of 1,3 - dichloro-1,1,3,3-tetrafluoroisopropylideneimine, prepared as described in Table I. The reaction mixture was allowed to reflux under a solid carbon dioxide cooled condenser for two hours and then distilled. There was obtained 38.3 g. of 1,3-dichloro-1,1,3,3-tetrafluoro-2,2-propanediamine as a colorless oil, B.P. 44.5–45° (10 mm.), $n_D^{25}$ 1.4105. The $F^{19}$ $n$–$m$–$r$ spectrum contained a single peak at −214 c.p.s. relative to Freon®.

*Analysis.*—Calcd. for $C_3H_4Cl_2F_4N_2$: C, 16.75; H, 1.88; Cl, 32.98; F, 35.36; N, 1303. Found: C, 17.01; H, 1.94; Cl, 32.82; F, 35.29; N, 12.37.

EXAMPLE IV

*N - phenyl-1-1,3-dichloro-1,1,3,3-tetrafluoro-2,2-propanediamine*

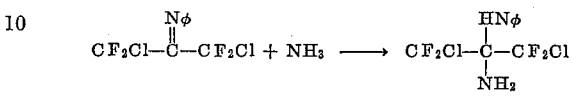

Ammonia, 2 ml., at −78° C. was slowly distilled into 13.4 g. (0.049 mole) of N-phenyl-1,3-dichloro-1,1,3,3-tetrafluoroisopropylideneimine, prepared as described below, and the reaction mixture was stirred overnight. The bright yellow color of the reaction mixture faded during this time. Distillation gave 10.8 g. of N-phenyl-1,3-dichloro-1,1,3,3-tetrafluoro-2,2-propanediamine as a colorless oil, B.P. 79–80° C. (0.3 mm.), $n_D^{25}$ 1.4983. The proton $n$–$m$–$r$ spectrum showed a multiplet at 3.08 $\tau$ (area 5) and singlets at 5.99 $\tau$ (area 1) and 8.16 $\tau$ (area 2).

*Analysis.*—Calcd. for $C_9H_8Cl_2F_4N_2$: C, 37.14; H, 2.77; Cl, 24.39; F, 26.12; N, 9.62. Found: C, 38.01; H, 2.89; Cl, 23.63; F, 25.05; N, 9.84.

The N-phenyl-1,3-dichloro - 1,1,3,3-tetrafluoropropylideneimine used in the above experiment was prepared as follows:

A 240 ml. Hastelloy reactor was charged with 10 g. of cesium fluoride, 100 g. (0.5 mole) of S-dichlorotetrafluoroacetone, and 50 g. of phenylisocyanate. The charge was heated at 100° C. for 2 hours, at 125° C. for 2 hours, and 150° C. for 8 hours. Thereafter the reactor was permitted to cool to ambient temperature, vented to the atmosphere, discharged, and the residual liquid distilled. From the distillation there were recovered 10.5 g. of a yellow oil, B.P. 72 to 73° C. (5.5 mm.), $n_D^{25}$ 1.4750. The infrared spectrum contained a band at $5.92\mu$ for CN, and the fluorine $n$–$m$–$r$ (56.4 mc.), when determined on a cold sample, showed two triplets centered at −775 c.p.s. and −602 c.p.s. (J. 19 c.p.s.) shifted from Freon 112®.

The analytical data indicate that the product, obtained above, was N-phenyl-1,3-dichloro - 1,1,3,3-tetrafluoropropylideneimine formed according to the equation:

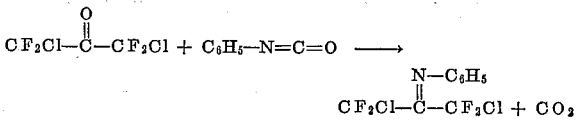

EXAMPLE V

*1-(1,1,1,3,3,3-hexafluoro-2-phenylamino-propyl)hydrazine*

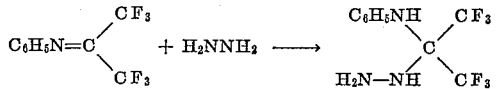

To a stirred mixture of 1.1 ml. (ca. 1.1 g.) of anhydrous hydrazine in 25 ml. of ether at room temperature was added a solution of 8.6 g. of N-phenylhexafluoropropylideneimine, prepared as described subsequently, in 25 ml. of ether. A slight exothermic effect was noted and the solution refluxed gently. The mixture was heated under reflux for two hours, at which point solid had separated on the walls of the flask. The addition of an additional 0.2 ml. of hydrazine gave no apparent change. The mixture was evaporated to dryness and the white solid residue was treated with pentane and filtered to give 6.41 g. of pale yellow crystalline 1[1,1,1,3,3,3-hexafluoro - 2-phenylamino)-propyl]-hydrazine, M.P. 76.3–77.9° C. A second crop of 1.64 g., M.P. 77.5–78.3° C. (total 8.05 g., 83% conversion) was obtained by cooling the filtrate. Two recrystallizations of the first crop from ether/pentane using activated carbon gave a colorless crystalline product, M.P. 74.2–74.7° C.

Infrared spectrum: 2.95, 3.06, 3.14, 3.19μ (NH and NH$_2$); 3.24, 3.88μ (=CH); 6.21, 6.43, 6.47μ (NH$_2$ and arom. C=C); strong absorption 8–9μ for C—F; 13.29, 14.39μ (monosubstituted aromatic). Proton n–m–r spectrum (in CHCl$_3$): 2.88τ (arom. H, 5X peak); 5.74τ (broad) and 6.63τ (sharp) of equal size for NH and NH$_2$. Fluorine n–m–r spectrum (in ether): single resonance for CF$_3$. Titration in ethanol-water with 0.1N NaOH showed buffering at pH 3.5–4.5 and a neutral equivalent of 276.

*Analysis.*—Calcd. for C$_9$H$_9$F$_6$N$_3$: F, 41.8; N, 15.4; N.E., 273. Found: F, 41.74; N, 15.06; N.E., 276.

The N-phenylhexafluoroisopropylideneimine used in the above experiment was prepared as follows:

A 240 ml. Hastelloy pressure reactor was charged with 24 g. of phenylisocyanate and 4.8 g. of powdered cesium fluoride (tube precooled, N$_2$ atm.) and then 50 g. of hexafluoroacetone was added. The mixture was thereafter heated under autogenous pressure at 100° C. for 2 hours, at 125° C. for 2 hours, and at 150° C. for 8 hours. The reactor was allowed to cool, and 16 g. of volatile product was collected in a stainless steel cylinder. This material was found by infrared and gas chromatographic analysis to contain carbon dioxide as the major component, along with unreacted hexafluoroacetone. The non-volatile product, 53 g., was filtered, and the filtrate, 39 g., on distillation with a spinning band column gave 35.9 g. (75% conversion) of N-phenylhexafluoroisopropylideneimine as a yellow liquid, B.P. 48 to 50° C. at 22 mm. The infrared spectrum showed bands at 3.26 (CH), 6.25, 6.30, and 6.70μ (arom. C=C), 5.78μ (C=N), 13.24 and 14.46μ (monosubstituted benzene), and strong absorption in the 8μ region (CF) in support of this structure. The UV spectrum in ethanol showed k3420A=5.95 and k2330A—13.5

The fluorine n–m–r spectrum (56.4 mc., "Freon 112" ref.) showed two resonances in the CF$_3$ region at −255 and +245 c.p.s. The proton n–m–r resonance showed several peaks in the aromatic region, 400 to 350 c.p.s. from (CH$_3$)$_4$Si at 60 mc.

*Analysis.*—Calcd. for C$_9$H$_5$F$_6$N: F, 47.3; N, 5.81. Found: F, 47.19; N, 5.79, 5.87, 5.64.

EXAMPLE VI

*2-amino-1,1,1,3,3,3-hexafluoro-2-propylhydrazine*

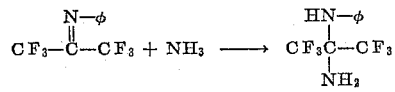

Hexafluoroisopropylideneimine, prepared as described in Example I, 33 g. (20 ml. at −10° C., 0.2 mole), was slowly distilled into a flask containing 6.4 g. (0.2 mole) of hydrazine. The reaction mixture was cooled in an ice bath during the addition. Distillation at reduced pressure gave 33.7 g. of 2-amino-1,1,1,3,3,3-hexafluoro-2-propylhydrazine as a colorless liquid, B.P. 73–74° C. (45 mm.), $n_D^{25}$ 1.3565. The F$^{19}$ n–m–r (56.4 mc.) showed a singlet at 635 c.p.s. from Freon 112® and the proton n–m–r (60 mc.) showed three broad singlets at 5.6 τ (area 1), 6.5 τ (area 2), and 7.5 τ (area 2).

*Analysis.*—Calcd. for C$_3$H$_5$F$_6$N$_3$: C, 18.31; H, 2.56; F, 57.84; N, 21.32. Found: C, 18.57; H, 2.67; F, 57.68; N, 21.59.

EXAMPLE VII

*2-amino-2-phenylamino-1,1,1,3,3,3-hexafluoropropane*

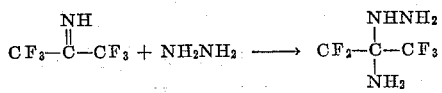

Ammonia, 5.g., was slowly distilled into a flask connected to a solid carbon dioxide-cooled reflux condenser and containing 18.4 g. of stirred N-phenylhexafluoropropylideneimine, prepared as described in Example VI. The yellow color of the reaction mixture faded near the end of the addition. The reaction mixture was distilled to give 17.1 g. of 2-amino-2-phenylamino-1,1,1,3,3,3,-hexafluoropropane as a colorless liquid, B.P. 48° C. (0.4 mm.), $n_D^{25}$ 1.4392. The infrared spectrum contained bands at 2.93μ 2.98μ and 3.1μ for NH and NH$_2$. The proton n–m–r showed a multiplet centered at 3.0 τ (area 5), a singlet at 6.10 τ (area 1) and a singlet at 8.23 τ (area 2).

*Analysis.*—Calcd. for C$_9$H$_8$F$_6$N$_2$: C, 41.86; H, 3.13; F, 44.16; N, 10.85. Found: C, 42.44; H, 3.14; F, 44.23; N, 11.44.

EXAMPLE VIII

*2-methylamino-2-dimethylaminoperfluoropropane*

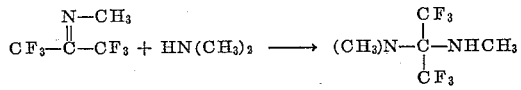

A mixture of 1.8 g. of N-methylperfluoroisopropylideneimine, prepared as described subsequently, and 2 ml. of dimethylamine was heated at reflux for 10 minutes and then distilled. There was obtained 1.5 g. of 2-methylamino-2-dimethylaminoperfluoropropane as a colorless liquid, B.P. 58–59° C. (100 mm.).

*Analysis.*—Calcd. for C$_6$H$_{10}$F$_6$N$_2$: C, 32.13; H, 4.50; F, 50.88; N, 12.49. Found: C, 32.87; H, 4.61; F, 51.20; N, 12.07.

The N-methylperfluoroisopropylideneimine used in the above experiment was made as follows:

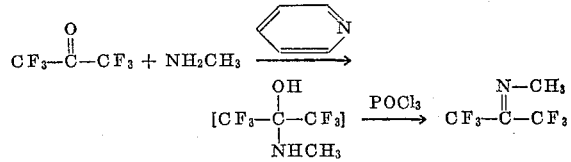

Hexafluoroacetone, 26 ml., at −78° C. (0.25 mole) was distilled into a flask containing 125 ml. of pyridine cooled to −25° C. Methylamine, 12 ml. at −10° C. (0.25 mole), was then distilled into the reaction mixture, keeping the temperature between −20° C. and −30° C. The reaction mixture was then allowed to warm to room temperature, and 25 ml. of phosphorus oxychloride was added dropwise over a period of 30 minutes. The mixture warmed spontaneously and began to boil. The evolved gases were condensed in a trap cooled by solid carbon dioxide. The reaction mixture was heated to 90° C. for one hour. The condensate was distilled to give 39.3 g. (87% yield) of N-methyl-1,1,1,3,3,3-hexafluoroisopropylideneimine as a colorless liquid, B.P. 34–35° C.; $n_D^{25}$ 1.3. The infrared spectrum of this imine contained a band at 5.87μ. The F$^{19}$ n–m–r (56.4 mc.) spectrum contained two quartets (J=8 c.p.s.) further split to doublets (J=2.5 c.p.s. and J=1.8 c.p.s., respectively) centered at −17 c.p.s. and +345 c.p.s. relative to 1,2-difluoro-1,1,2,2-tetrachloroethane an O

*Analysis.*—Calcd. for C$_4$H$_3$F$_6$N: C, 26.82; H, 1.69; F, 63.67; N, 7.83. Found: C, 27.94; H, 1.98; F, 63.76; N, 7.66.

The hexafluoropropane-2,2-diamine used in the above experiment was made as described in Example II.

In the right column of Table I are listed the products that are obtained when the thioketones listed in the left column are substituted for the perfluorothioacetone of Example I in the process of Example I.

TABLE I

| Reactants | | Products |
|---|---|---|
| $CF_3-\overset{S}{\overset{\|}{C}}-CF_2CF_3 + HN_3$ | $\longrightarrow$ | $CF_3-\overset{NH}{\overset{\|}{C}}-CF_2CF_3$ |
| $C_3F_7-\overset{S}{\overset{\|}{C}}-C_5F_{11} + NH_3$ | $\longrightarrow$ | $C_3F_7-\overset{NH}{\overset{\|}{C}}-C_5F_{11}$ |
| $HCF_2CF_2-\overset{S}{\overset{\|}{C}}-CF_3 + HN_3$ | $\longrightarrow$ | $HCF_2CF_2-\overset{NH}{\overset{\|}{C}}-CF_3$ |
| $ClCF_2CF_2-\overset{S}{\overset{\|}{C}}-CF_3 + HN_3$ | $\longrightarrow$ | $ClCF_2CF_2-\overset{NH}{\overset{\|}{C}}-CF_3$ |
| $CF_2Cl-\overset{S}{\overset{\|}{C}}-CF_2Cl + HN_3$ | $\longrightarrow$ | $CF_2Cl-\overset{NH}{\overset{\|}{C}}-CF_2Cl$ |
| $C_7F_{15}-\overset{S}{\overset{\|}{C}}-C_7F_{15} + HN_3$ | $\longrightarrow$ | $C_7F_{15}-\overset{NH}{\overset{\|}{C}}-C_7F_{15}$ |

In the right column of Table II are listed the diamines that are obtained when the imines listed in the left column are substituted for the hexafluoroisopropylideneimine of Example I in the process of Example II.

TABLE II

| Reactants | | Products |
|---|---|---|
| $CF_3-\overset{NH}{\overset{\|}{C}}-C_2F_5 + NH_3$ | $\longrightarrow$ | $CF_3-\overset{NH_2}{\underset{NH_2}{\overset{\|}{\underset{\|}{C}}}}-C_2F_5$ |
| $C_3F_7-\overset{NH}{\overset{\|}{C}}-C_5F_{11} + NH_3$ | $\longrightarrow$ | $C_3F_7-\overset{NH_2}{\underset{NH_2}{\overset{\|}{\underset{\|}{C}}}}-C_5F_{11}$ |
| $HCF_2CF_2-\overset{NH}{\overset{\|}{C}}-CF_3 + NH_3$ | $\longrightarrow$ | $HCF_2CF_2-\overset{NH_2}{\underset{NH_2}{\overset{\|}{\underset{\|}{C}}}}-CF_3$ |
| $ClCF_2CF_2-\overset{NH}{\overset{\|}{C}}-CF_3 + NH_3$ | $\longrightarrow$ | $ClCF_2CF_2-\overset{NH_2}{\underset{NH_2}{\overset{\|}{\underset{\|}{C}}}}-CF_3$ |
| $CF_2Cl-\overset{NH}{\overset{\|}{C}}-CF_2Cl + NH_3$ | $\longrightarrow$ | $CF_2Cl-\overset{NH_2}{\underset{NH_2}{\overset{\|}{\underset{\|}{C}}}}-CF_2Cl$ |
| $C_7F_{15}-\overset{NH}{\overset{\|}{C}}-C_7F_{15} + NH_3$ | $\longrightarrow$ | $C_7F_{15}-\overset{NH_2}{\underset{NH_2}{\overset{\|}{\underset{\|}{C}}}}-C_7F_{15}$ |

The new diamines of this invention are useful as polymer intermediates and as inhibitors in vinyl-type polymerizations. Thus, they react with diisocyanates to give polyureas which have valuable properties and inhibit the polymerization of styrene, as illustrated below:

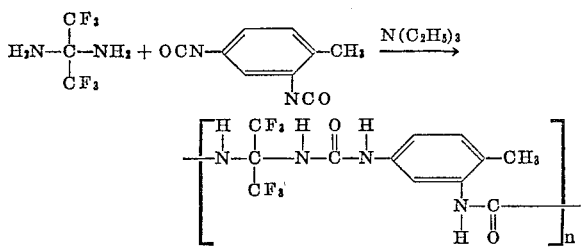

A mixture of 182 mg. (0.001 mole) of hexfluoropropane-2,2-diamine, prepared as in Example II, 179 mg. (0.001 mole) of toluene-2,4-diisocyanate, and one microdrop of triethylamine was heated for 5 hours. On cooling, a light yellow, extremely viscous liquid was obtained. This product gave a strong bond between two pieces of wood illustrating that it is useful as a laminated adhesive.

A solution of 20 g. of freshly distilled styrene in 50 ml. of benzene containing 0.1 g. of α,α′-azodiisobutyronitrile was heated at reflux for five hours. Extensive polymerization occurred.

The experiment was repeated with the addition of 1 g. of perfluoropropane-2,2-diamine, prepared as in Example II, to the benzene solution. No polymerization occurred after five hours of heating.

Similarly, 1 g. of N-phenyl-1,3-dichloro-1,1,3,3-tetrafluoro-2,2-propanediamine inhibited the polymerization of 20 g. of styrene.

As many widely different embodiments may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

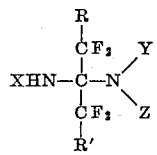

wherein R and R′ are members of the group consisting of hydrogen, halogen, perhaloalkyl of up to 18 carbon atoms, and ω-hydroperhaloalkyl of up to 18 carbon atoms, the halogen in each R and R′ being of atomic number 9 to 17 inclusive; X is selected from the group consisting of hydrogen, alkyl of up to 18 carbon atoms, cycloalkyl of up to 7 carbon atoms; Y is selected from the group consisting of hydrogen, alkyl of up to 18 carbon atoms, cycloalkyl of up to 7 carbon atoms, amino and mono- and disubstituted amino wherein the substituent is selected from the group consisting of alkyl of up to 18 carbon atoms and cycloalkyl of up to 7 carbon atoms, and Z is selected from the group consisting of hydrogen, alkyl of up to 18 carbon atoms and cycloalkyl of up to 7 carbon atoms.

2. Process for producing a compound of claim 1 comprising (I) contacting and reacting, under reflux conditions and in a reaction medium inert to the reactants and reaction products, (a) an alkylidenimine of the formula

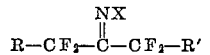

wherein R and R′ are members of the group consisting of hydrogen, halogen, perhaloalkyl of up to 18 carbon atoms and ω-hydroperhaloalkyl of up to 18 carbon atoms, the halogen in each R and R′ being of atomic number 9 to 17 inclusive and X is selected from the group consisting of hydrogen, alkyl of up to 18 carbon atoms, cycloalkyl of up to 7 carbon atoms with (b) at least an equivalent molar amount of a member of the group consisting of ammonia, mono- and disubstituted amines wherein the substituent is selected from the group consisting of alkyl of up to 18 carbon atoms, cycloalkyl of up to 7 carbon atoms, hydrazine and mono- and disubstituted hydrazines wherein the substituent is selected from the group consisting of alkyl of up to 18 carbon atoms and cycloalkyl of up to 7 carbon atoms, and (II) isolating the resultant polyfluorinated nitrogen-containing compound.

3. A compound as defined in claim 1 wherein R, R′, X, Y, and Z each contain fewer than eight carbon atoms.

4. Hexafluoropropane-2,2-diamine.

5. 1,1-dichloro-1,1,3,3-tetrafluoro-2,2-propanediamine.

6. 2-amino-1,1,1,3,3,3-hexafluoro-2-propylhydrazine.

7. 2-methylamino-2-dimethylaminoperfluoropropane.

8. Process as defined in claim 2 wherein said reaction medium is an organic solvent and wherein the reaction mixture is refluxed for at least 15 minutes after addition of all reactants has been completed.

9. A compound of the formula

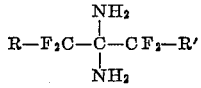

wherein R and R′ each represents halogen of atomic number 9 to 17 inclusive.

10. A compound of the formula

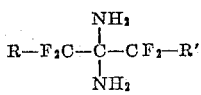

wherein R and R′ each represents perhaloalkyl of fewer than eight carbon atoms, the halogen of said perhaloalkyl being of atomic number 9 to 17 inclusive.

11. A compound of the formula

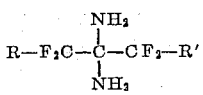

wherein R and R′ each represents ω-hydrohaloalkyl of fewer than eight carbon atoms, the halogen of said hydrohaloalkyl being of atomic number 9 to 17 inclusive.

12. The process of preparing diaminopolyhaloalkanes in which all halogens are of atomic number 9–17 which comprises adding at least an equimolar amount of ammonia to a refluxing solution of inert organic reaction medium and an imine of the formula:

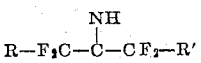

wherein R and R′ are selected from the group consisting of halogen of atomic number 9–17 and haloalkyl of up to 7 carbons in which all halogens are of atomic number 9–17, and then maintaining the resultant mixture under reflux for at least 15 minutes.

13. The process of claim 12 wherein said imine is hexafluoropropylideneimine.

References Cited
UNITED STATES PATENTS

| | | | |
|---|---|---|---|
| 2,878,287 | 3/1959 | Levine et al. | 260—553 |
| 2,997,501 | 8/1961 | Shiino et al. | 260—553 |
| 3,019,261 | 1/1962 | Pascal | 260—561 |
| 3,052,723 | 9/1962 | Tullock | 260—583 |
| 3,082,254 | 3/1963 | Pawloski | 260—569 |
| 3,120,524 | 2/1964 | Godfrey | 260—268 |
| 3,123,621 | 3/1964 | Herring | 260—349 |
| 3,126,412 | 3/1964 | Stahly | 260—577 |
| 3,126,413 | 3/1964 | Zimmerman | 260—577 |
| 3,134,816 | 5/1964 | Scott et al. | 260—583 |
| 3,156,724 | 11/1964 | Werner et al. | 260—569 |
| 3,170,948 | 2/1965 | Frazza et al. | 260—456.5 |
| 3,174,992 | 3/1965 | McCracken | 260—465.5 |
| 3,185,693 | 5/1965 | Dunbar | 260—268 |
| 3,187,020 | 6/1965 | Minisci | 260—349 |
| 3,187,044 | 6/1965 | Robertson | 260—561 |
| 3,226,439 | 12/1965 | Middleton | 260—583 |

OTHER REFERENCES

Zeifman et al., Doklady Akademiia Nauk SSSR, vol. 153, No. 6, pp. 1334–1337, 1963.

ALEX MAZEL, *Primary Examiner.*

HENRY R. JILES, *Examiner.*

JAMES W. ADAMS, *Assistant Examiner.*